May 6, 1924.
A. M. WOLF
1,493,175
MOTOR VEHICLE TRANSMISSION
Filed Feb. 16, 1923    3 Sheets-Sheet 1
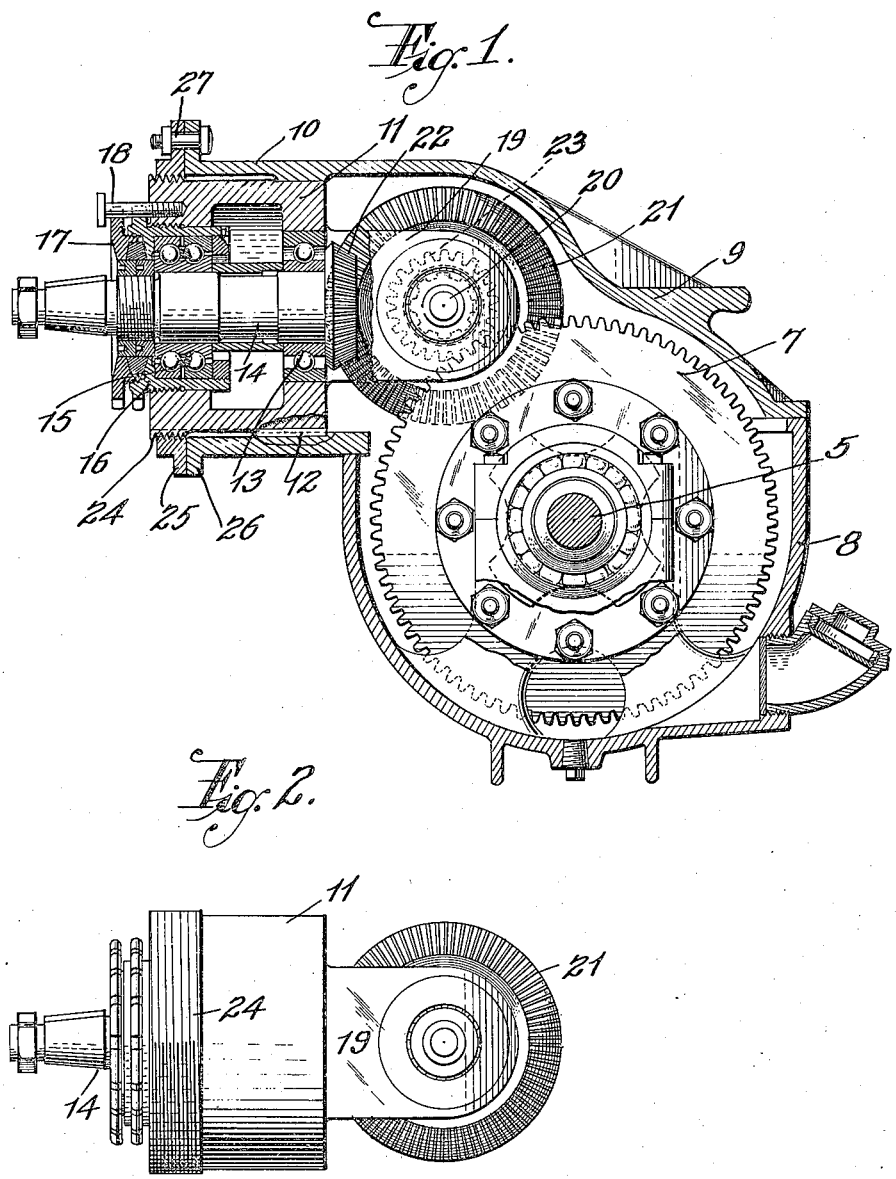
INVENTOR
Austin M. Wolf,
BY C. P. Giefel
ATTORNEY May 6, 1924.　　　　　　　　　　　　　　　1,493,175
A. M. WOLF
MOTOR VEHICLE TRANSMISSION
Filed Feb. 16, 1923　　　3 Sheets-Sheet 2
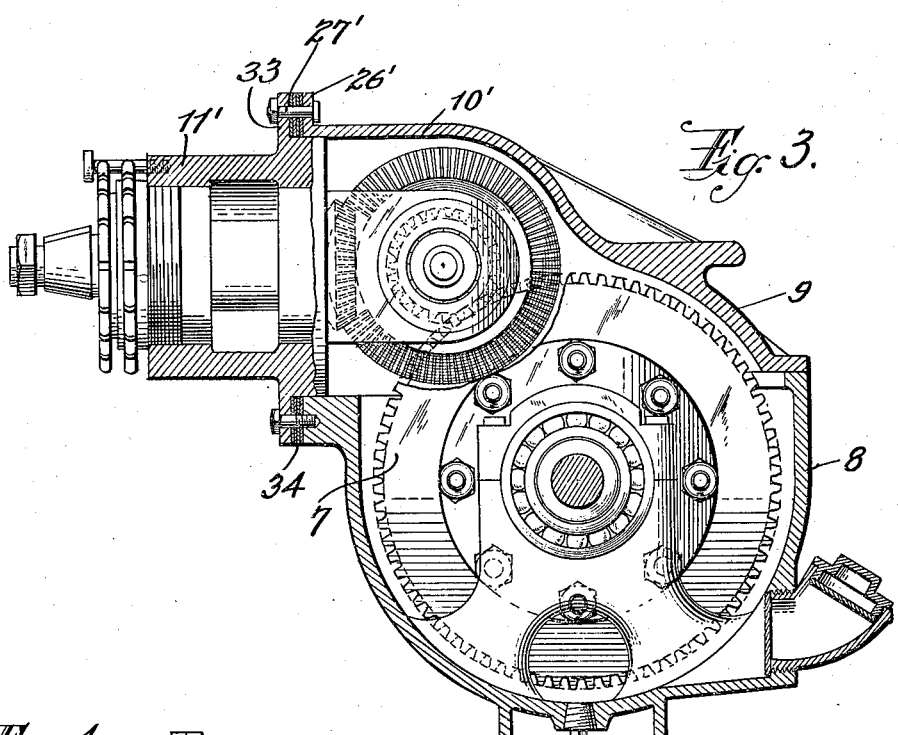
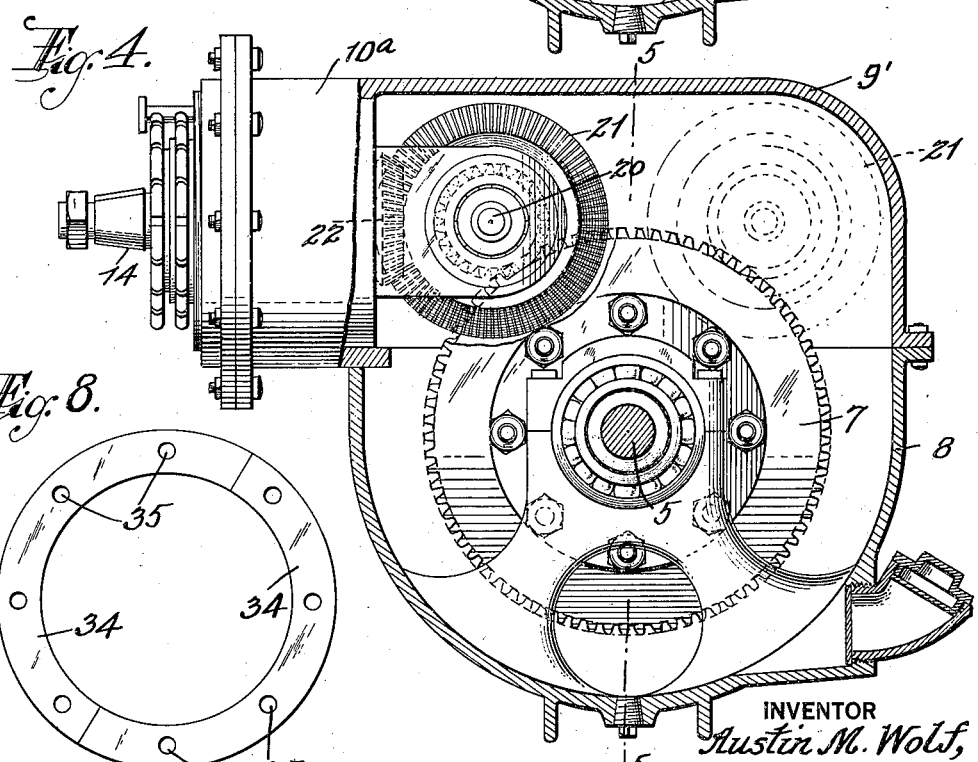
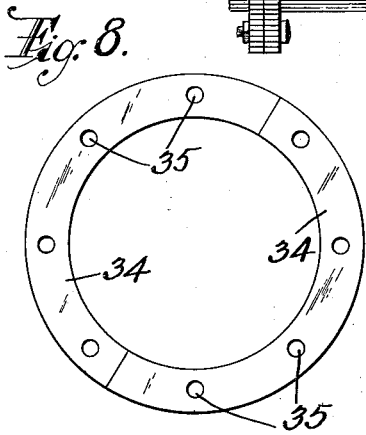
INVENTOR
Austin M. Wolf,
BY
C. P. Goepel
ATTORNEY

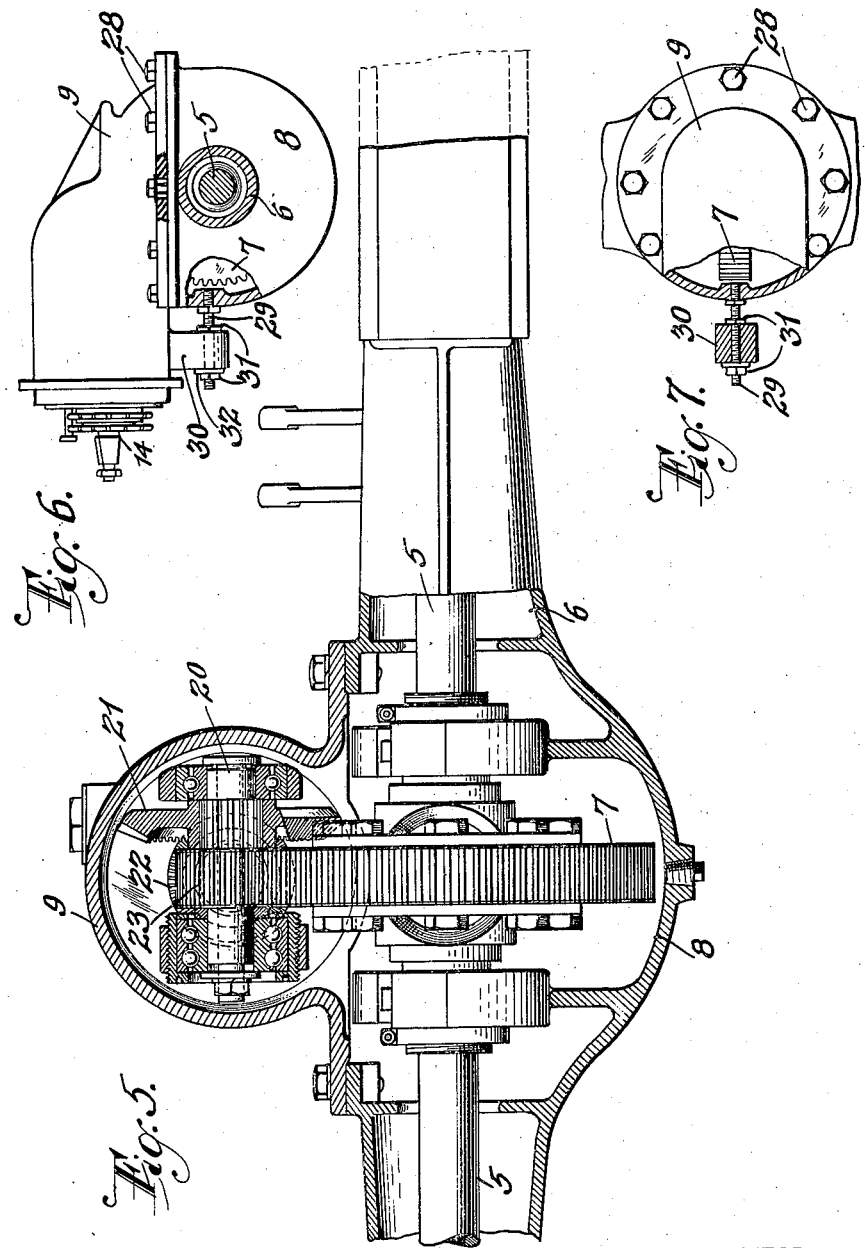

Patented May 6, 1924.

1,493,175

UNITED STATES PATENT OFFICE.

AUSTIN M. WOLF, OF PLAINFIELD, NEW JERSEY, ASSIGNOR OF ONE-HALF TO LEON OTTINGER, OF NEW YORK, N. Y.

MOTOR-VEHICLE TRANSMISSION.

Application filed February 16, 1923. Serial No. 619,383.

*To all whom it may concern:*

Be it known that I, AUSTIN M. WOLF, a citizen of the United States, and a resident of Plainfield, county of Middlesex, and State of New Jersey, have invented certain new and useful Improvements in Motor-Vehicle Transmissions, of which the following is a specification.

This invention relates to motor vehicle transmission and more particularly to an improved mounting and arrangement of the double reduction gearing such as is usually employed on automobile trucks for transmitting the driving power from the motor to the rear axle members at reduced speed.

It is the primary object and purpose of my present improvements to provide a very simple, compact and inexpensive mounting and arrangement of the double reduction gearing so that it will be easily accessible for the purpose of inspection and repair and whereby proper adjustments may be easily and quickly made from the exterior of the housing or casing so that misalignment or wear of the teeth of the coacting gear elements may be compensated for and the proper intermeshing of the gears with each other assured.

It is another object of the invention to provide means whereby the double reduction gearing as a whole, may be mounted for movement as a single unit into or out of operative relation to the differential gearing connecting the axle members without requiring the removal of the upper housing section enclosing the gearing.

With the above and other objects in view, the invention consists in the improved motor vehicle transmission and in the form, construction, mounting and relative arrangement of the several parts thereof as will be hereinafter more fully described, illustrated in the accompanying drawings and subsequently incorporated in the subjoined claims.

In the drawings wherein I have illustrated several desirable and satisfactory embodiments of the invention and in which similar reference characters designate corresponding parts throughout the several views:

Figure 1 is a transverse sectional view through the enclosing housing illustrating one mounting for the double reduction gearing;

Figure 2 is a detail view of the double reduction gear unit removed from the housing;

Figure 3 is a view similar to Figure 1 showing a modified form of the device;

Figure 4 is a similar view illustrating another modification;

Figure 5 is a sectional view taken on the line 5—5 of Figure 4;

Figure 6 is a detail elevation partly in section showing a means for adjusting the housing or casing of the reduction gearing upon the lower housing section for the differential gearing;

Figure 7 is a plan view partly in section; and

Figure 8 is a detail elevation of one of the sectional adjusting shims shown in Figure 3.

In the illustrated embodiment of the invention, I have shown the two axle sections 5 through which power is transmitted to the rear vehicle wheels, mounted and arranged within the axle casing 6 in a conventional manner. These axle sections are operatively connected at their inner ends by the usual differential gearing which includes the ring spur gear 7. The axle casing 6 is enlarged at its central portion to provide a lower housing section 8 in which the differential gearing is enclosed. Upon this housing section 8 there is detachably and adjustably mounted an upper housing section 9 which receives the upper portion of the spur gear 7 and within which the reduction gearing, which I shall presently refer to in detail, is mounted and supported.

In the embodiments of the invention illustrated in Figures 1 and 3 of the drawings, the rear side of the wall of the housing section 9 is closely adjacent to the ring spur gear 7 and extends in concentric relation thereto. Forwardly of the differential gearing the housing section 9 is formed with a lateral or horizontally projecting cylindrical portion 10. In the construction shown in Figure 1 of the drawings, a cylindrical support 11 is removably engaged within the end of the tubular extension 10 of the housing section and is held against rotative movement therein by means of a suitable key 12 which, however, permits of a longitudinal sliding movement of the support relative to the housing.

The inner end of the support 11 is adapted to receive a suitable ball bearing 13 for the inner end of the driving shaft 14 which is operatively connected in the customary manner with the vehicle motor (not shown). The other end of the driving shaft 14 is also mounted in suitable ball bearings 15 arranged within the outer ends of the support 11. The latter ball bearings are contained within an outer sleeve 16 threaded in the support, said sleeve being held in adjusted position by means of the collar 17 and a locking bolt 18 which is threaded in the support 11 and is adapted for engagement in aligned notches formed in a flange on the outer end of the sleeve 16 and in the collar 17.

Upon the inner end of the support 11 at opposite sides of the bearing 13, the bearing arms 19 in which a shaft 20 is journaled, are formed. Upon this shaft the large beveled gear 21 of the first speed reduction is suitably secured and is engaged by the beveled pinion 22 fixed to or integrally formed with the inner end of the driving shaft 14. The spur pinion 23 which meshes with the ring spur gear 7 of the differential gearing may be either formed integrally with the beveled gear 21 or suitably fixed as an independent element upon the shaft 20. This pinion by its coaction with the spur gear 7 produces the second speed reduction so that the axle sections 5 will be driven at a relatively low speed. It is to be particularly noted that the cylindrical extension 10 of the upper housing section 9 and the beveled gear 21 are of such relative diameters that said beveled gear may be easily moved through the cylindrical portion of the housing.

The support 11 upon which the driving shaft 14 and the speed reduction gearing are mounted projects beyond the open end of the cylindrical extension 10 of the housing and is exteriorly threaded as at 24 to receive the threaded ring 25. The cylindrical portion 10 of the housing is formed with an annular flange 26. This flange and the ring 25 are provided with circumferentially spaced openings which are adapted to be brought into registering relation to receive the connecting bolts 27. By removing these bolts and threading the ring 25 outwardly on the support 11, said support with the reduction gearing may be easily adjusted as a unit with respect to the upper housing section so as to insure a proper intermeshing engagement between the teeth of the pinion 23 and the spur gear 7. By then adjusting the ring against the flange 26 and again inserting the bolts 27, the support may be rigidly fixed in its adjusted position.

The upper housing section 9 for the reduction gearing may be detachably mounted upon the lower housing section 8 by means of the bolts 28 which are disposed through openings in the flange of the upper housing section of slightly greater diameter than said bolts and are threaded into the flange of the lower housing section. Suitable washers are arranged between the heads of said bolts and the openings through which they extend. In order to compensate for looseness in the connections between the driving shaft and the motor shaft or possible misalignment due to excessive vibration, I provide the device shown in Figures 6 and 7. This device consists of a threaded rod or bolt 29, one end of which is threaded into the front wall of the housing section 8 for the differential gearing. At its other end, this threaded rod is seated within the bifurcated lower end of an arm 30 formed on the underside of the cylindrical extension 10 of the upper housing section 9. By the proper adjustment of the nuts 31 threaded on said rod at the front and rear sides of the arm 30, the upper housing section may be readily shifted relative to the bolts 28. By then tightening said bolts and readjusting the nuts 31 the two housing sections may be rigidly held against relative movement and the reduction gearing thus retained in proper position relative to the differential gear. Preferably, suitable washers 32 are interposed between the nuts 31 and the arm 30.

The double reduction gearing above described, may, when in need of repair be readily removed as a single unit from its operative position with relation to the differential spur gear 7, without necessitating the removal of the upper housing section 9. Thus by simply detaching the threaded ring 25 from the end of the support 11, this support carrying with it the drive shaft 14, and the gearing mounted between the arms 19 on said support can be readily withdrawn as a unit through the cylindrical extension 10 of the upper housing section. After such repairs as are necessary have been made, the reduction gearing can be reinserted within the upper housing section and quickly secured in proper operative relation to the differential spur gear 7.

In Figure 3 of the drawings I have shown a slightly different form of the support 11 for the drive shaft and reduction gearing in which, instead of providing the external threads 24 and adjusting ring 25 on the outer end of the support, the horizontal cylindrical extension 10′ of the upper housing section is relatively short and the support 11′ adjacent the end thereof which is provided with the bearing arms for the reduction gearing is formed with an external annular flange 33 having circumferentially spaced openings to register with similar openings provided in the end flange 26' on the casing extension 10'.

Between the flanges 33 and 26', a plurality of thin annular metal shims are interposed. Each of these shims is made up of two similar semi-circular sections 34, as seen in Figure 8 of the drawings, each of said sections having spaced bolt receiving openings 35 adapted to register with the openings in said flanges. When it becomes necessary to adjust the support 11' in order to obtain the proper intermeshing relation of the pinion 23 with the spur gear 7, the connecting bolts 27' are removed with the exception of a single bolt at the upper side of the support. One of the half sections 34 of a metal shim may then be engaged upon this bolt and the support 11' temporarily fitted in place against the shim section. When it is found that the teeth of the pinion 23 and gear 7 properly mesh with each other, the lower sections of the shims can then be inserted in place between the flanges 26' and 33 and the remaining bolts 27' disposed through the registering openings in the flanges and the shim sections and tightened up to thereby rigidly secure the support 11' in fixed position upon the extension 10' of the housing. In this manner, it will be seen that the necessary adjustment of the support upon which the reduction gearing is mounted can be easily and quickly made.

In Figure 4 of the drawings, I have shown the upper housing section 9' for the reduction gearing of slightly different form. In this case the rear end portion of said housing section is somewhat extended and does not closely follow the spur gear 7. The extension 10ª of said upper housing section in this case may be of somewhat reduced diameter, since as shown in dotted lines, the reduction gearing is inserted in its operative position in the support mounted upon said housing extension, before the housing section is applied upon and secured to the housing section which encloses the differential gearing. In this instance, therefore, it will be understood that the reducing gearing is removable from its applied position with respect to the differential gearing with the upper housing section 9'. Either one of the two means above described may, however, be provided for effecting an independent bodily adjustment of the reduction gearing with respect to the housing section 9' so as to obtain a proper intermeshing relation of the coacting gear elements.

From the foregoing description considered in connection with the accompanying drawings, the construction, manner of operation and several advantages of the invention may be readily understood. It will be seen that I have provided in a motor vehicle transmission of that type designed for use upon motor trucks, and the approved mounting and arrangement of the speed reduction gearing which is simple and inexpensive and whereby the necessary adjustments may be easily and quickly made so that the proper functioning of said gear elements with a smooth transmission of the driving impulse to the wheel axles may be obtained. Also, since access can be readily had to all parts of the speed reduction gear without necessitating the detachment of the two housing sections, it is apparent that such repairs as may from time to time become necessary can be quickly made with a minimum loss of time.

While I have herein described and shown several practical and satisfactory embodiments of the invention, it is nevertheless to be understood that the objects in view might be attained by means of various other alternative constructions and I, therefore, reserve the privilege of resorting to all such legitimate changes as may be fairly embodied within the spirit and scope of the invention as claimed.

I claim:

1. In combination with a differential gearing and housing therefor having a laterally extending tubular part, a reduction gearing movable as a unit through said tubular housing part into its operative position with relation to said differential gearing, a bearing support for the reduction gearing mounted upon said tubular housing part, and means for adjusting said bearing support to obtain a proper coacting relation between the reduction gearing and the differential gearing.

2. In combination with the axle sections and differential gearing, a lower housing section for said gearing, an upper housing section detachably mounted upon said lower section, a support, a double reduction gearing mounted upon said support and including a gear element adapted for engagement with one of the parts of the differential gearing, and means for adjustably mounting said support upon the upper housing section to thereby obtain a proper coacting relation of the reduction gearing with the differential gearing.

3. In combination with the axle sections and differential gearing, a lower housing section for said gearing, an upper housing section detachably mounted upon said lower section, a double reduction gearing, a support therefor, means for detachably mounting said support upon the upper housing section with the reduction gearing in operative relation to the differential gearing whereby said gearing may be removed as a unit from its operative position, and additional means for adjusting said support relative to the housing section to obtain a proper coacting relation between the reduction gearing and the differential gearing.

4. In combination with the axle sections and differential gearing, a housing for said gearing, a speed reduction gearing, a housing section therefor, means for laterally adjusting said latter housing section with relation to the housing section for the differential gearing, and means for rigidly securing the housing section for the speed reduction gearing in its adjusted position.

In testimony that I claim the foregoing as my invention, I have signed my name hereunder.

AUSTIN M. WOLF.